(12) United States Patent
Asakawa et al.

(10) Patent No.: US 8,505,111 B2
(45) Date of Patent: Aug. 6, 2013

(54) CANTILEVER EXCITATION DEVICE AND SCANNING PROBE MICROSCOPE (75) Inventors: Hitoshi Asakawa, Ishikawa (JP); Takeshi Fukuma, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 0 days.

(21) Appl. No.: 13/388,504

(22) PCT Filed: Aug. 6, 2010

(86) PCT No.: PCT/JP2010/004973
§ 371 (c)(1),
(2), (4) Date: Apr. 12, 2012

(87) PCT Pub. No.: WO2011/016256
PCT Pub. Date: Feb. 10, 2011

(65) Prior Publication Data
US 2012/0192320 A1    Jul. 26, 2012

(30) Foreign Application Priority Data

Aug. 6, 2009   (JP) ................................. 2009-183723

(51) Int. Cl.
*G01Q 70/04*  (2010.01)
(52) U.S. Cl.
USPC .................... 850/54; 850/53; 850/52; 850/60
(58) Field of Classification Search
None
See application file for complete search history.

(56) References Cited

U.S. PATENT DOCUMENTS 6,094,971 A * 8/2000 Edwards et al. ................ 73/105

FOREIGN PATENT DOCUMENTS

| JP | 07-159422 A | 6/1995 |
| JP | 07248335 A * | 9/1995 |
| JP | 2003329565 A * | 11/2003 |
| JP | 2006-153574 A | 6/2006 |
| JP | 2006-184079 A | 7/2006 |
| JP | 2008-203058 A | 9/2008 |

OTHER PUBLICATIONS

International Search Report for PCT/JP2010/004973; Oct. 26, 2010.
International Preliminary Report; Mar. 22, 2012.
Carrasco, C., et al. "Cutting down the forest of peaks in acoustic dynamic atomic force microscopy in liquid." In: Review of Scientific Instruments 79, American Institute of Physics, 2008; pp. 126106-1-126106-2.

(Continued)

*Primary Examiner* — Andrew Smyth
(74) *Attorney, Agent, or Firm* — Pearne & Gordon LLP (57) ABSTRACT Provided is a cantilever excitation device capable of preventing complication of resonance characteristics by a simple configuration. A cantilever excitation device (1) is provided with a cantilever (7), a cantilever holder (3) for holding the cantilever (7), and a piezoelectric vibrator (5) attached to the cantilever holder (3). The cantilever holder (3) includes a holder main part (11) (first part) having an acoustic impedance different from that of the piezoelectric vibrator (5) for transmitting vibration of the piezoelectric vibrator by elastic deformation and an attachment piece (13) (second part) having the acoustic impedance different from that of the first part for forming a material boundary to block propagation of an acoustic wave between the same and the first part. The first and second parts are interposed between the piezoelectric vibrator (5) and the cantilever (7).

11 Claims, 7 Drawing Sheets (56) References Cited

OTHER PUBLICATIONS

Kokavecz, J., et al. "Investigation of fluid cell resonances in intermittent contact mode atomic force microscopy." In: Applied Physics Letters 91, American Institute of Physics, 2007; pp. 023113-1-023113-3.

Schaffer, T.E., et al. "Studies of vibrating atomic force microscope cantilevers in liquid." In: Journal of Applied Physics, American Institute of Physics, vol. 80, No. 7; Oct. 1, 1996; pp. 3622-3627.

Wenhai, H., et al. "A magnetically driven oscillating probe microscope for operation in liquids." In: Applied Physics Letters, vol. 69, No. 26; Dec. 23, 1996; pp. 4111-4113.

Jarvis, S.P., et al. "A novel force microscope and point contact probe." In: Review of Scientific Instruments, American Institute of Physics, vol. 64, No. 12; Dec. 1993; pp. 3515-3520.

Umeda N., et al. "Scanning attractive force microscope using photothermal vibration." In: Journal of Vacuum Science Techonolgy B, American Vacuum Society, vol. 9, No. 2; Mar./Apr. 1991; pp. 1318-1322.

\* cited by examiner

(b) A-A cross-section (c) B-B cross-section

C-C cross-section (c)

FIG. 3

| | Material | Young's modulus $E_Y$(GPa) | Density(kg/m3) | Acoustic impedance $Z_a(\times 10^6 kg/m^2 s)$ |
|---|---|---|---|---|
| | PZT | 52 | 7.7 | 33 |
| (Material group A) | SUS304 | 197 | 7.8 | 40 |
| | SUS316 | 197 | 7.9 | 36 |
| | BK7 | 82 | 2.5 | 11 |
| (Material group B) | PEEK | 3.5 | 1.3 | 3.2 |
| | POM | 2.7 | 1.4 | 3.2 |
| | PTFE | 1.5 | 2.1 | 2.8 |

CANTILEVER EXCITATION DEVICE AND SCANNING PROBE MICROSCOPE

RELATED APPLICATIONS

The present application claims benefits of the Japanese Patent Application No. 2009-183723 filed on Aug. 6, 2009 in Japan, and the contents of the application are herein incorporated by reference.

TECHNICAL FIELD

The present invention relates to a cantilever excitation device for exciting vibration of a cantilever using a piezoelectric vibrator.

BACKGROUND ART

Conventionally, a scanning probe microscope (SPM) is used in observation of a minute specimen. An atomic force microscope (AFM) is known as the SPM.

The AFM brings a sharp probe close to the specimen and detects interaction force acting between the probe and the specimen. The cantilever, which has the probe on a tip thereof is used as a force sensor for detecting the interaction force. The AFM performs feedback control of a distance between the probe and the specimen so as to keep the interaction force constant and further scans the probe (or the specimen) in a horizontal direction in a state in which the feedback control is maintained. By this, the probe (or the specimen) goes up and down so as to trace concavity and convexity of the specimen. Then, by recording a trace of scanning, a concavo-convex image of a surface of the specimen is obtained.

A dynamic mode AFM is known as a kind of the general AFM. The dynamic mode AFM vibrates the cantilever with minute amplitude and detects the interaction force between the probe and the specimen as change in frequency, phase, and amplitude of the cantilever vibration. The dynamic mode AFM is utilized not only in a vacuum and an atmosphere but also in a liquid environment.

An acoustic excitation method is used as an excitation method of the cantilever in the dynamic mode AFM. The acoustic excitation method is disclosed in Non-Patent Literatures 1, 2, and 3, for example.

The acoustic excitation method transmits an acoustic wave generated by the piezoelectric vibrator to the cantilever to excite the cantilever. The acoustic excitation method is widely used because of its relatively simple structure. However, there remains a problem of stability and quantitative characteristics in the liquid environment in the acoustic excitation method. Hereinafter, the acoustic excitation method and the problem thereof are described.

The acoustic excitation method generates the acoustic wave by applying AC potential to the piezoelectric vibrator and efficiently propagates the acoustic wave to the cantilever through a medium, thereby exciting the cantilever vibration. In the acoustic excitation method, the acoustic wave propagates through the medium such as a cantilever holder, so that mechanical resonance in a holder structure is excited. In the dynamic mode AFM in liquid, structural resonance propagates in solution in addition to the holder structure to be transmitted to the cantilever. Therefore, there is the problem of complication of response characteristics of the phase and the amplitude of the cantilever vibration, that is to say, frequency response characteristics to a cantilever excitation signal.

Further, a Q-factor of resonance of the cantilever is significantly low in the liquid as compared to that in the vacuum and the atmosphere. Therefore, an effect of the structural resonance increases and this causes deterioration in the stability and reliability of dynamic mode AFM measurement.

In order to solve the above-described problem, it is considered to directly drive the cantilever. As a direct drive method, a magnetic excitation method (Non-Patent Literatures 4 and 5) and a photothermal excitation method (Non-Patent Literature 6) have been suggested. In the magnetic excitation method, magnetic coating is applied to the cantilever or magnetic beads are adhered thereto. In the photothermal excitation method, a gold thin film is provided on the cantilever and infrared light or ultraviolet light is applied thereto.

However, in the direct drive method, a process to coat a back surface of the cantilever with a magnetic body and a metal thin film is necessary. In a case of the AFM in liquid, increase in contamination by elution of a back surface coating material is problematic. Also, in a process of the coating on the back surface, it is difficult to prevent the coating material from going around a surface side on which the probe is formed and there is the problem of deterioration in sharpness of the probe. Further, in order to obtain driving force of the cantilever vibration, a magnetic coil or a laser modulating device is required. Therefore, a device configuration is complicated and general-purpose property thereof is low. By such background, application of the direct drive method is limited as a result.

On the other hand, the acoustic excitation method does not require modification of the cantilever and this may be realized only by a small piezoelectric vibrator and wiring to apply potential. Therefore, the acoustic excitation method is widely utilized in the field of the AFM. Therefore, it is desired to use the acoustic excitation method also when using the dynamic mode AFM in the liquid environment. However, as already described, there is the problem of the complication of the frequency response characteristics of the cantilever by the effect of the structural resonance of the cantilever holder generated by propagation of the acoustic wave in the liquid environment.

Then, it is strongly desired to develop the cantilever excitation method capable of inhibiting the complication of the frequency response characteristics by the configuration as simple as that of the acoustic excitation method. It is considered that, if such cantilever excitation method is provided, the stability and the reliability of the dynamic mode AFM in liquid may be significantly improved by the simple configuration.

The background art is described above in regard to the dynamic mode AFM, especially by taking the dynamic mode AFM used in the liquid environment as an example. However, a similar matter might be problematic in an optional case in which the cantilever is excited in the liquid and the like. That is to say, the similar problem might occur in the cantilever excitation device of optional application.

CITATION LIST

Patent Literature

Patent Literature 1: Japanese Patent Application Laid-Open No. H07-159422
Patent Literature 2: Japanese Patent Application Laid-Open No. 2006-153574

Non-Patent Literatures

Non-Patent Literature 1: C. Carrasco et al., "Cutting down the forest of peaks in acoustic dynamic atomic force microscopy in liquid", Review of Scientific Instruments 79, American Institute of Physics, 2008, p. 126106-1-2

Non-Patent Literature 2: J. Kokavecz et al., "Investigation of fluid cell resonances in intermittent contact mode atomic force microscopy", Applied Physics Letters 91, American Institute of Physics, 2007, p. 023113-1-3

Non-Patent Literature 3: T. E. Schaffer et al., "Studies of vibrating atomic force microscope cantilevers in liquid", J. Appl. Phys., American Institute of Physics, 1 Oct. 1996, Vol. 80, No. 7, pp. 3622-3627

Non-Patent Literature 4: Wenhai Han et al., "A magnetically driven oscillating probe microscope for operation in liquids", Appl. Phys. Lett., American Institute of Physics, 23 Dec. 1996, Vol. 69, No. 26, pp. 4111-4113

Non-Patent Literature 5: S. P. Jarvis et al., "A novel force microscope and point contact probe", Rev. Sci. Instrum., American Institute of Physics, December 1993, Vol. 64, No. 12, pp. 3515-3520

Non-Patent Literature 6: N. Umeda et al., "Scanning attractive force microscope using photothermal vibration", J. Vac. Sci. Technol. B, American Vacuum Society, March/April 1991, Vol. 9, No. 2, pp. 1318-1322

SUMMARY OF THE INVENTION

Problems to be Solved by the Invention

The present invention is achieved in the above-described background and an object thereof is to provide the cantilever excitation device capable of preventing the complication of the frequency response characteristics of the cantilever by the simple structure.

Means for Solving the Problems

An aspect of the present invention is a cantilever excitation device for exciting vibration of a cantilever, including: the cantilever; a cantilever holder for holding the cantilever; and a piezoelectric vibrator attached to the cantilever holder, wherein the cantilever holder includes a first part having an acoustic impedance different from that of the piezoelectric vibrator for transmitting the vibration of the piezoelectric vibrator by elastic deformation and a second part having the acoustic impedance different from that of the first part for forming a material boundary to block propagation of an acoustic wave between the same and the first part, and the first part and the second part are interposed between the piezoelectric vibrator and the cantilever.

Meanwhile, although there are the device configured not to transmit acoustic vibration of a piezoelectric vibration element to a supporting unit, which supports the piezoelectric vibrator and the cantilever, (Patent Literature 1) and the device configured not to transmit the acoustic vibration of the piezoelectric vibrator to the holder, which holds the cantilever, (Patent Literature 2) as the conventional art related to the invention of the present application, unlike the conventional art in which the cantilever is excited by the acoustic vibration, the invention of the present application is based on the technical idea completely different from that of the conventional art in that the acoustic vibration is not transmitted to the cantilever and the cantilever is excited by the elastic deformation.

The acoustic impedance of the first part may be not higher than half the acoustic impedance of the piezoelectric vibrator and the acoustic impedance of the second part may be not lower than twice the acoustic impedance of the first part. Also, an elastic modulus of the first part may be not higher than one-tenth of the elastic modulus of the second part.

The first part may be interposed between the piezoelectric vibrator and the second part and the second part may be interposed between the first part and the cantilever.

The first part may be a holder main part including an elastic hinge, the second part may be an attachment member for attaching the cantilever to the holder main part, and the piezoelectric vibrator and the attachment member may be attached on one side and the other side of the elastic hinge, respectively.

The cantilever holder may include an optical window member for transmitting measurement light of displacement of the cantilever, the optical window member may have the acoustic impedance different from that of the holder main part and form the material boundary to block the propagation of the acoustic wave between the same and the holder main part.

An entire periphery of the piezoelectric vibrator may be enclosed by at least one member having the acoustic impedance different from that of the piezoelectric vibrator.

Another aspect of the present invention is a scanning probe microscope, including: the above-described cantilever excitation device. In the scanning probe microscope, the cantilever excitation device is such that the cantilever and a portion of the cantilever holder for holding the cantilever may be soaked in liquid and this may be used in a state in which a portion of the cantilever holder to which the piezoelectric vibrator is attached is separated from the liquid.

Another aspect of the present invention is a cantilever excitation method for transmitting vibration of a piezoelectric vibrator to a cantilever to excite the vibration of the cantilever, including: providing a cantilever holder including a first part having an acoustic impedance different from that of the piezoelectric vibrator for transmitting the vibration of the piezoelectric vibrator by elastic deformation and a second part having the acoustic impedance different from that of the first part for forming a material boundary to block propagation of an acoustic wave between the same and the first part, arranging the piezoelectric vibrator and the cantilever such that the first part and the second part are interposed between the piezoelectric vibrator and the cantilever; applying an excitation voltage signal to the piezoelectric vibrator; and exciting the cantilever by transmitting the vibration of the piezoelectric vibrator to the cantilever by the elastic deformation of the first part while limiting the propagation of the acoustic wave of the piezoelectric vibrator by the material boundary.

Another aspect of the present invention is a method of manufacturing a cantilever excitation device for transmitting vibration of a piezoelectric vibrator to a cantilever to excite the vibration of the cantilever, including: preparing a first part and a second part as components of a cantilever holder, the first part being a component having an acoustic impedance different from that of the piezoelectric vibrator for transmitting the vibration of the piezoelectric vibrator by elastic deformation and the second part being a component having the acoustic impedance different from that of the first part for forming a material boundary to block propagation of an acoustic wave between the same and the first part, and arranging the piezoelectric vibrator, the cantilever, the first part, and the second part such that the first part and the second part are interposed between the piezoelectric vibrator and the cantilever.

Effects of the Invention

The present invention may provide the cantilever excitation device capable of preventing the complication of the frequency response characteristics of the cantilever by the simple structure.

As described hereinafter, the present invention has another aspect. Therefore, the disclosure of the invention is intended to provide a part of the aspects of the present invention and is not intended to limit the scope of the invention herein described and claimed.

BEST MODES FOR CARRYING OUT THE INVENTION

The present invention is hereinafter described in detail. However, following detailed description and the attached drawings are not intended to limit the invention. Instead, the scope of the invention is defined by the scope of attached claims.

A cantilever excitation device of an embodiment of the present invention is hereinafter described with reference to the drawings. In this embodiment, the cantilever excitation device is applied to a dynamic mode AFM. Especially, the dynamic mode AFM is used in liquid in this embodiment. However, the present invention is not limited to the dynamic mode AFM and may be applied to another device.

In the present invention, a holder member, which fixes a piezoelectric vibrator, is made of a material having an acoustic impedance greatly different from that of the piezoelectric vibrator. By selection of such material, generation of an acoustic wave is inhibited. Further, the present invention limits excitation and propagation of unnecessary structural resonance of a cantilever holder by forming a material boundary at which the acoustic impedance greatly changes around the piezoelectric vibrator to block a propagation path of the acoustic wave. Therefore, it is possible to inhibit an effect of the structural resonance and prevent complication of cantilever frequency response characteristics.

In the present invention, elastic deformation is utilized in place of the acoustic wave to excite the cantilever using. In order to efficiently utilize the elastic deformation, the present invention selects the material having a relatively low elastic modulus for the holder member and provides an elastic hinge structure on a portion on which the piezoelectric vibrator is installed. As a result, it is possible to vibrate the cantilever by utilizing displacement of the elastic hinge and it is possible to excite the cantilever while inhibiting the effect of the structural resonance in the holder.

The device of the present invention is realized by a configuration to apply a voltage signal to the piezoelectric vibrator held by the holder member. Therefore, a device structure may be simple as that of an acoustic excitation method. The present invention is capable of significantly improving quantitative characteristics and stability of the dynamic mode AFM in liquid and force curve measurement also by a cantilever excitation method by a simple device configuration using the piezoelectric vibrator.

When the conventional acoustic excitation method and this embodiment are compared to each other, they are common in having the simple configuration using the piezoelectric vibrator. However, unlike the conventional acoustic excitation method, which positively propagates the acoustic wave, the present invention inhibits the generation and propagation of the acoustic wave and excites the cantilever by elastic displacement in place of this. From this point of view, the method of the present invention may be referred to as a "flexure drive mechanism".

FIGS. 1(a) to 1(c) illustrate the cantilever excitation device of this embodiment. FIG. 1(a) is a bottom view and FIGS. 1(b) and 1(c) are cross-sectional views taken along lines A-A and B-B in FIG. 1(a), respectively.

As a device outline, a cantilever excitation device 1 is composed of a circular cantilever holder 3 and a piezoelectric vibrator 5 and a cantilever 7 attached to an upper part and a lower part of the cantilever holder 3, respectively. The cantilever holder 3 is composed of a holder main part 11, an attachment piece 13 for attaching the cantilever 7 to the holder main part 11, and an optical window member 15. The holder main part 11 corresponds to a first part of the present invention and the attachment piece 13 corresponds to a second part of the present invention and to an attachment member.

An elastic hinge 25 is formed on the holder main part 11 for increasing the elastic deformation. The piezoelectric vibrator 5 is attached on one side of the elastic hinge 25 and the attachment piece 13 is attached on the other side thereof. A lever base part 33 of the cantilever 7 is attached to the attachment piece 13.

The cantilever excitation device 1 is arranged such that the cantilever 7 is soaked in solution. The piezoelectric vibrator 5 is located on the other side of the holder main part 11, so that contact thereof with the solution may be avoided. Therefore, it is possible to maintain electric insulation of the piezoelectric vibrator 5 from the solution. According to this, contamination of the solution by elution of insulating coating of the piezoelectric vibrator may be prevented.

The holder main part 11 is made of a material having the acoustic impedance greatly different from that of the piezoelectric vibrator 5 having a low elastic modulus. Also, the attachment piece 13 is made of a material having the acoustic impedance greatly different from that of the holder main part 11. According to this, as is to be described later in detail, the generation and the propagation of the acoustic wave from the piezoelectric vibrator 5 are effectively inhibited. In this embodiment, the elastic displacement is utilized to excite the cantilever 7 in place of the acoustic wave. That is to say, vibration of the piezoelectric vibrator 5 is transmitted to the cantilever 7 by the elastic displacement of the elastic hinge 25 and the cantilever 7 vibrates. Excitation by the elastic displacement is also described later in detail.

The optical window member 15 secures a laser light path for detecting displacement of the cantilever 7 by an optical lever method. The optical winder member 15 also is made of a material having the acoustic impedance greatly different from that of the holder main part 11 and this effectively inhibits the propagation of the acoustic wave.

The outline of the cantilever excitation device 1 is described above. Next, the configuration of the cantilever excitation device 1 is described in detail.

Figure 2:
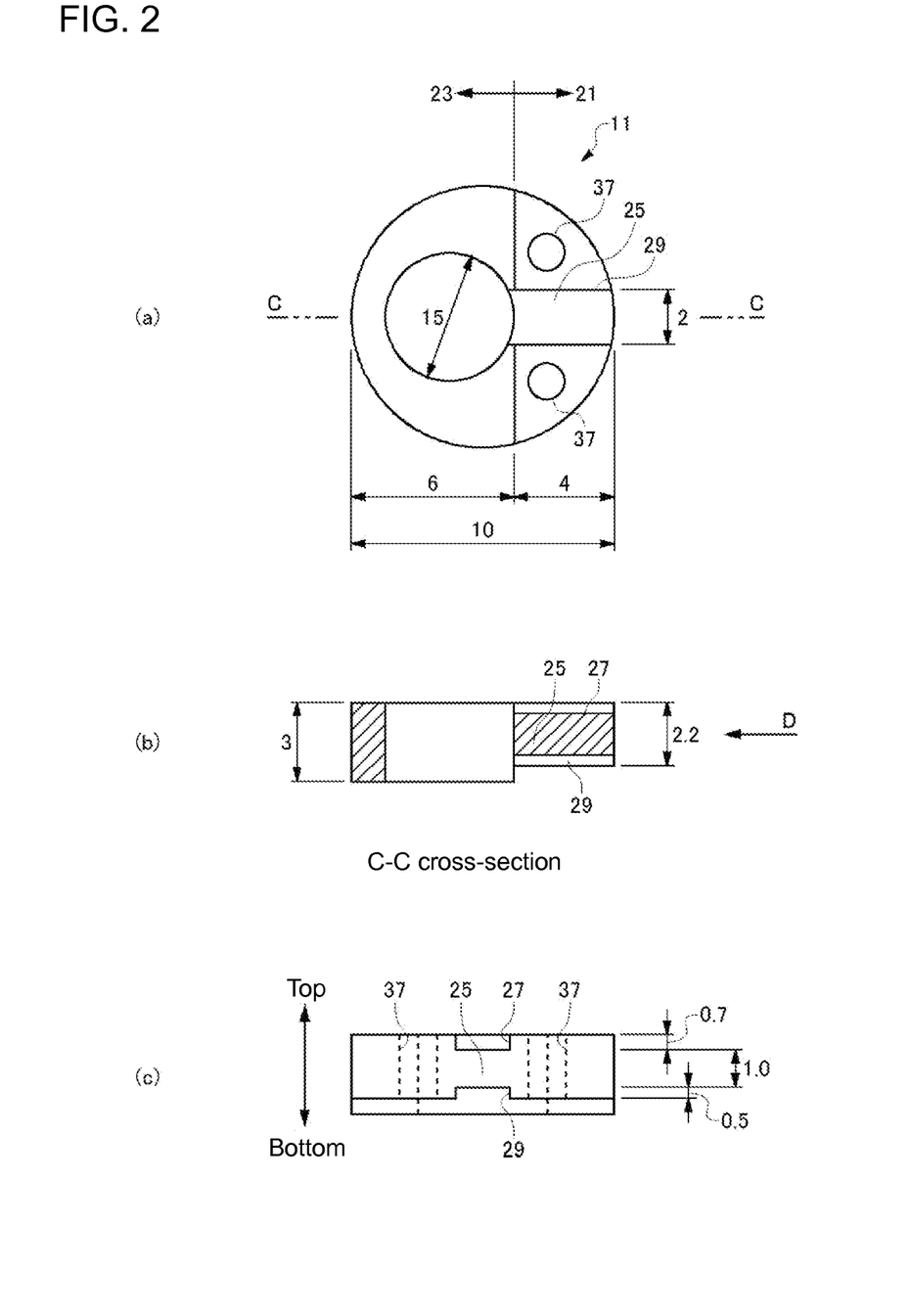
FIG. 2(a) is a bottom view of a holder main part.
FIG. 2(b) is a cross-sectional view of the holder main part.
FIG. 2(c) is a side view of the holder main part.

FIGS. 2(a) to 2(c) illustrate the holder main part 11. FIG. 2(a) is a bottom view, FIG. 2(b) is a cross-sectional view taken along a line C-C in FIG. 2(a), and FIG. 2(c) is a side view as seen in a direction indicated by an arrow D in FIG. 2(b).

The holder main part 11 has a cylindrical shape and is divided into an attachment region 21 and a window region 23. The attachment region 21 is the region to which the piezoelectric vibrator 5 and the cantilever 7 are attached and the window region 23 is the region to which the optical window member 15 is attached. The attachment region 21 and the window region 23 are divided by a straight line shifted from the center as illustrated. A step is provided between the attachment region 21 and the window region 23 and the window region 23 is formed to be thicker than the attachment region 21.

The elastic hinge 25 is provided on the attachment region 21. The elastic hinge 25 is a part on which an amount of elastic deformation locally increases. In this embodiment, as illustrated, the elastic hinge 25 is a local thin part provided on the center of the attachment region 21, that is to say, the part obtained by providing concave portions 27 and 29 on both surfaces of the holder main part 11.

The piezoelectric vibrator 5 and the attachment piece 13 are attached on both sides of the elastic hinge 25. The piezoelectric vibrator 5 is attached to one surface of the elastic hinge 25. In an illustrated example, the piezoelectric vibrator 5 is attached to an upper surface of the elastic hinge 25, that is to say, a bottom of an upper concave portion 27 on the attachment region 21 of the holder main part 11. The piezoelectric vibrator 5 is a piezoelectric element, which deforms according to an applied voltage. In the cantilever excitation device 1, an AC potential signal is applied and the piezoelectric vibrator 5 vibrates. The piezoelectric vibrator 5 has a thin plate shape.

The attachment piece 13 is a member for attaching the cantilever 7 to the holder main part 11. The attachment piece 13 is attached on one side of the elastic hinge 25 and the piezoelectric vibrator 5 is attached on the other side of the elastic hinge 25, and according to this, the elastic hinge 25 is interposed between the attachment piece 13 and the piezoelectric vibrator 5. In the illustrated example, the attachment piece 13 is attached to a lower surface of the elastic hinge 25, that is to say, a bottom of a lower concave portion 29 of the holder main part 11.

The attachment piece 13 has a lever attachment surface 31 on a side opposite to a surface to be attached to the holder main part 11. The lever attachment surface 31 is inclined with respect to a lower surface of the holder and an inclination angle is 13 degrees. The cantilever 7 is attached to the lever attachment surface 31.

The cantilever 7 made of silicon is composed of a plate-shaped lever base part 33 and a lever part 35 protruding from a tip of the lever base part 33, and the lever part 35 has a probe on a tip thereof. The lever base part 33, the lever part 35, and the probe form an integral member. Since the lever attachment surface 31 of the attachment piece 13 is inclined, the cantilever 7 is obliquely attached such that a tip thereof descends as illustrated. Also, the cantilever 7 is arranged such that the tip of the lever part 35 protrudes to a position facing to the optical window member 15 so as to face to the optical window member 15.

As described above, the cantilever 7 is arranged so as to be soaked in the solution. On the other hand, as illustrated in FIG. 2(b), the attachment region 21 to which the attachment piece 13 is attached is formed to be thinner than the window region 23 in the holder main part 11. By this configuration, as illustrated in FIG. 1(b), it is possible to set an amount of the solution such that a bottom surface of the optical window member 15 is brought into contact with the solution and a bottom surface of the attachment region 21 of the holder main part 11 does not soak in the solution.

Also, attachment holes 37 are further provided on both sides of the elastic hinge 25 in the attachment region 21. The attachment holes 37 are used for fixing the cantilever excitation device 1 to the AFM and the like.

The optical window member 15 is provided on the window region 23. The optical window member 15, which is circular, is fitted into a circular through-hole of the window region 23. The optical window member 15 is transparent and is glass in this embodiment. For measuring the displacement of the cantilever 7, laser light is applied to the cantilever 7 through the optical window member 15 and reflected light is received by a sensor (not illustrated) through the optical window member 15.

Next, an appropriate material of each component of the cantilever excitation device 1 is described. As already described, the holder main part 11 is made of the material having the acoustic impedance greatly different from that of the piezoelectric vibrator 5 and the low elastic modulus. The attachment piece 13 and the optical window member 15 are made of the materials having the acoustic impedances greatly different from that of the holder main part 11.

Figure 3:
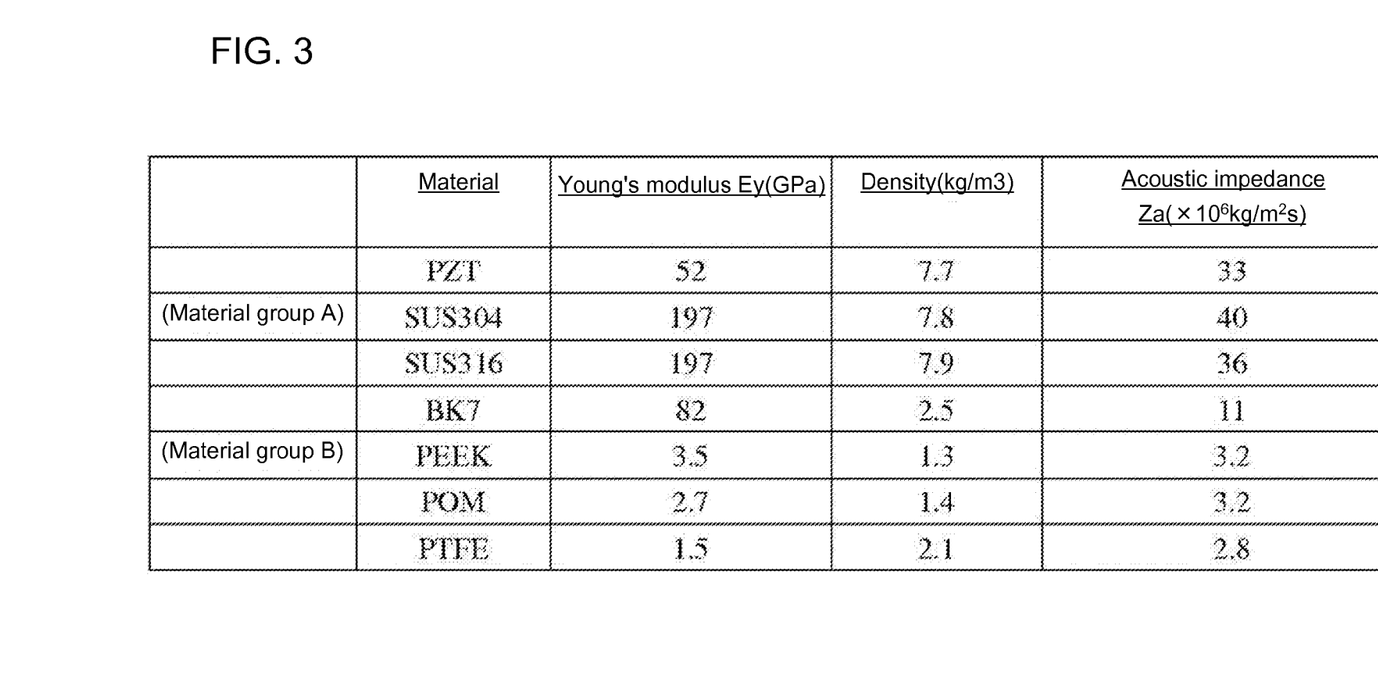
FIG. 3 is a view illustrating a Young's modulus, density, and an acoustic impedance of a component material.

FIG. 3 illustrates the appropriate materials of the piezoelectric vibrator 5, the holder main part 11, the attachment piece 13, and the optical window member 15. FIG. 3 illustrates a Young's modulus $E_Y$, density, and acoustic impedance $Z_a$ of each material.

The material of the piezoelectric vibrator 5 is lead zirconate titanate (PZT) as a general piezoelectric material as illustrated on an uppermost part in FIG. 3.

A material group A includes the materials suitable for the attachment piece 13 and the optical window member 15. Out of them, stainless steels SUS304 and SUS316 are suitable for the attachment piece 13. A reference sign BK7 represents the glass and this is suitable for the optical window member 15.

A material group B includes the material suitable for the holder main part 11, and especially, the material also having chemical resistance of which acoustic impedance and elastic modulus are appropriate. In FIG. 3, three types of engineering plastics, that is to say, polyetheretherketone (PEEK™, polyoxymethylene (PON, DURACON™, polytetrafluoroethylene (PTFE, Teflon™ are illustrated.

From FIG. 3, the acoustic impedance of the material group A (attachment piece 13 and optical window member 15) is not lower than 10 kg/m²s and the acoustic impedance of the material group B (holder main part 11) is not higher than 5 kg/m²s. It may also be said that the acoustic impedance of the holder main part 11 is not higher than half the acoustic impedance of the piezoelectric vibrator 5 and the acoustic impedances of the attachment piece 13 and the optical window member 15 are not lower than twice the acoustic impedance of the holder main part 11.

Also, from FIG. 3, the Young's modulus of the material group A is not lower than 100 GPa and the Young's modulus of the material group B is not higher than 10 GPa. It may also be said that the elastic modulus of the holder main part 11 is not higher than one-tenth of the elastic modulus of the attachment piece 13.

When specifically selecting the material, the chemical resistance is required in a solution contacting part and the material from which ion is eluted cannot be used. Machinability also is required. In an example of this embodiment, the material of the holder main part 11 is PEEK™, the material of the attachment piece 13 is SUS316, and the material of the optical window member 15 is BK7. They preferably satisfy requirements of the chemical resistance and the machinability.

Next, a size of the cantilever excitation device 1 is described. In the example of this embodiment, a diameter of the holder main part 11 is 10 mm, as illustrated in FIG. 3. A thickness of the attachment region 21 is 2.2 mm and the thickness of the window region 23 is 3 mm.

A boundary between the attachment region 21 and the window region 23 is shifted by 1 mm from the holder center, therefore, a length of the elastic hinge 25 in a radial direction is 4 mm. A width of the elastic hinge 25 is 2 mm. A depth of the concave portion 27 is 0.7 mm, the depth of the concave portion 29 is 0.5 mm, and the thickness of the elastic hinge 25 is 1 mm. The diameter of the optical window member 15 is 5 mm and the center of the window is shifted by 1.5 mm from the holder center.

The length of the attachment piece 13 is 3.5 mm, the width thereof is 2 mm, and the thickness thereof is 1.5 mm. The inclination of the lever attachment surface 31 is 13 degrees as already described.

In addition, a diameter of the attachment hole 37 is 1.5 mm and a pitch between the two attachment holes 37 is 5 mm.

Meanwhile, the Young's modulus, a size, and a structure of the holder main part 11 are designed such that a resonance frequency of the elastic hinge 25 is near the resonance frequency of the cantilever 7 or not lower than this. The resonance frequency of the cantilever 7 in the liquid is approximately 1 kHz to 1 MHz in general and the size of a base material of the cantilever 7 is approximately 1.6 mm in width, 3.4 mm in length, and 0.3 mm in thickness in general. For example, in order to realize the elastic hinge 25 having an appropriate size for supporting the base material of this size and is capable of deforming at the frequency in this range, the material having the Young's modulus not lower than 1 Gpa is preferable for the holder main part 11.

Next, an example of a method of manufacturing the cantilever excitation device 1 is described. First, the holder main part 11, the attachment piece 13, the optical window member 15, the piezoelectric vibrator 5, and the cantilever 7, which are the components, are prepared.

Then, the piezoelectric vibrator 5, the cantilever 7, the holder main part 11, and the attachment piece 13 are arranged such that the holder main part 11 and the attachment piece 13 are interposed between the piezoelectric vibrator 5 and the cantilever 7. For example, the cantilever 7 is attached to the attachment piece 13, the attachment piece 13 is attached to the holder main part 11, and the piezoelectric vibrator 5 also is attached to the holder main part 11. Also, the optical window member 15 is fitted into the through-hole of the holder main part 11.

In this manner, the cantilever excitation device 1 is formed. The cantilever excitation device 1 is attached to the following AFM, for example.

Figure 4:
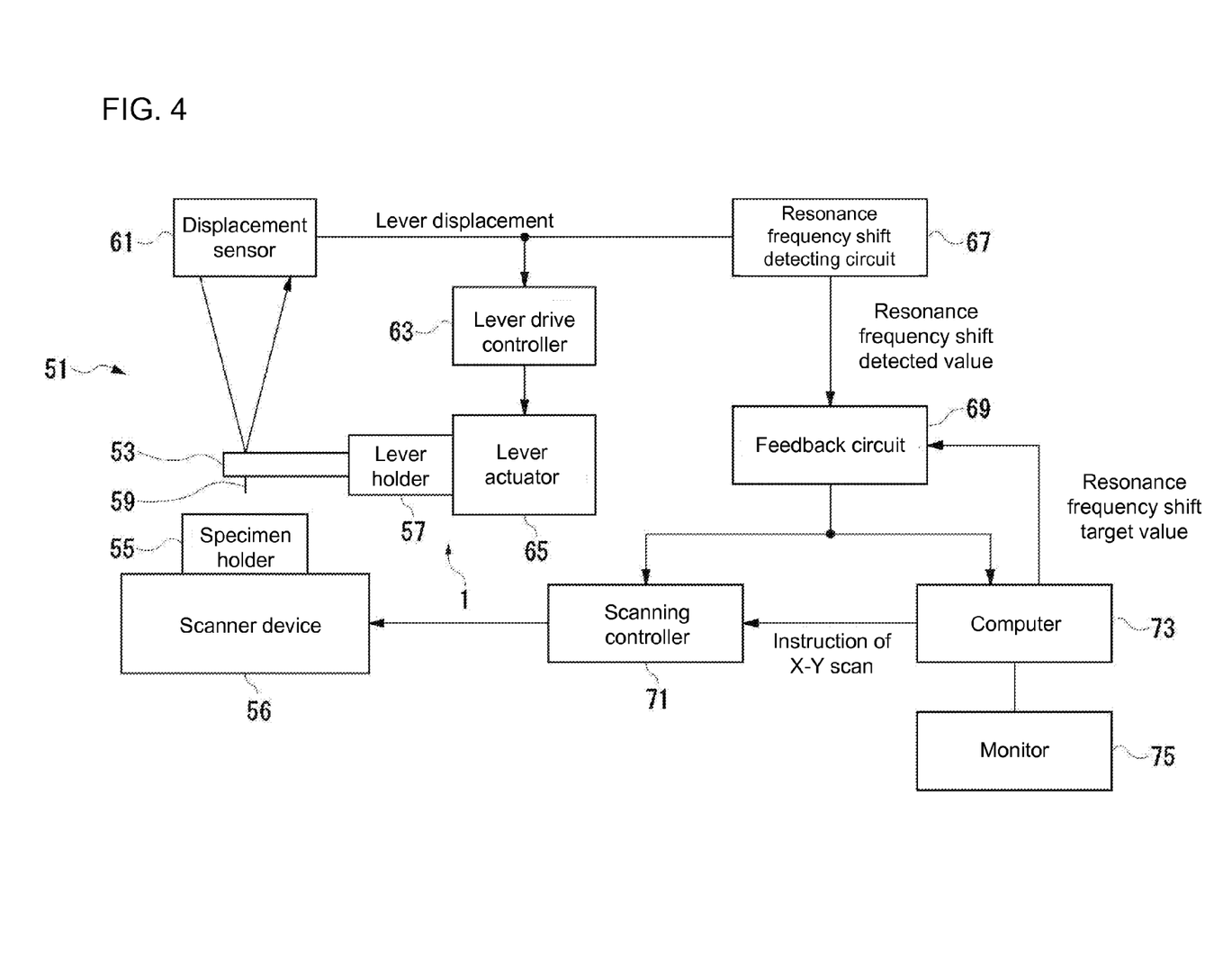
FIG. 4 is a view illustrating an example of a scanning probe microscope provided with the cantilever excitation device.

Next, with reference to FIG. 4, an example of a scanning probe microscope (SPM) provided with the cantilever excitation device 1 of this embodiment is described. In this example, the SPM is the AFM and especially is a frequency modulation (FM)-AFM. The FM-AFM causes self-excited oscillation of the cantilever at the resonance frequency and performs feedback control in a Z-direction (Z-position control) so as to maintain a shift amount of the resonance frequency by interaction of the cantilever and a specimen at a constant value. The FM-AFM has high space resolution and may also be used in a non-contact mode.

In FIG. 4, an AFM 51 is provided with a cantilever 53 and a specimen holder 55. The specimen holder 55 is attached to a scanner device 56. The cantilever 53 is held by a lever holder 57. The cantilever 53 has a probe 59 and is arranged so as to be close to the specimen on the specimen holder 55.

The AFM 51 is provided with a displacement sensor 61 for detecting the displacement of the cantilever 53 in the Z-direction. A lever drive controller 63 controls a lever actuator 65 (piezoelectric element) based on the lever displacement and causes the self-excited oscillation of the cantilever 53. When the probe 59 comes close to the specimen in a state of the self-excited oscillation of the cantilever 53, the resonance frequency of the cantilever 53 shifts according to the interaction between the probe 59 and the specimen. A resonance frequency shift detecting circuit 67 detects a resonance frequency shift of the cantilever 53 based on the lever displacement. A feedback circuit 69 generates a feedback signal corresponding to difference between a detected value and a target value of the resonance frequency shift. A scan controller 71 controls drive of the scanner device 56 in a Z-axis direction according to the feedback signal. Also, the scan controller 71 allows the scanner device 56 to scan in X-Y directions according to control data of X-Y scanning supplied from a computer 73.

In this manner, the scanner device 56 performs the Z-position control for maintaining a distance between the probe 59 and the specimen constant while performing the X-Y scanning. An output signal of the feedback circuit of the Z-position control corresponds to a height of the specimen in the Z-direction. The computer 73 generates an image of a surface of the specimen to display on a monitor 75 based on the control data of the X-Y scanning and the output signal of the feedback circuit of the Z-position control. A three-dimensional image is preferably generated to be displayed.

In FIG. 4, the cantilever 53, the lever holder 57, and the lever actuator 65 correspond to the cantilever 7, the cantilever holder 3, and the piezoelectric vibrator 5 of the above-described embodiment, respectively, to compose the cantilever excitation device 1 of the present invention. Although not illustrated in FIG. 4, the lever holder 57 is composed of the holder main part, the attachment piece, and the optical window member as described above. The displacement sensor 61 is an optical lever type and detects the lever displacement through the optical window member. Also, the AFM 51 is preferably used in the liquid.

An example of the SPM provided with the cantilever excitation device 1 of this embodiment is described above. Next, excitation operation by the cantilever excitation device 1 is described.

An excitation signal is applied to the piezoelectric vibrator 5 for exciting the cantilever 7. The excitation signal is the voltage signal supplied from a circuit of the AFM and this changes periodically. The excitation signal is typically a sine wave (cosine wave).

When the excitation signal is applied, the piezoelectric vibrator 5 vibrates and this vibration is transmitted to the cantilever 7 through the cantilever holder 3. Herein, this embodiment is characterized in that the generation and the propagation of the acoustic wave are inhibited, the vibration is transmitted by the elastic deformation instead, and the cantilever 7 vibrates.

Hereinafter, inhibition of the generation and the propagation of the acoustic wave and the excitation by holder elastic deformation are described.

<Inhibition of Generation and Propagation of Acoustic Wave>

The generation and the propagation of the acoustic wave by the piezoelectric vibrator 5 is inhibited when values of the acoustic impedance ($Z_a$) of the piezoelectric vibrator 5 and a member to fix the same are greatly different from each other. This device inhibits the generation and the propagation of the acoustic wave by utilizing the characteristics and significantly decreases the effect of the structural resonance due to the acoustic wave, thereby preventing the complication of the frequency response characteristics of the cantilever 7.

Figure 5:
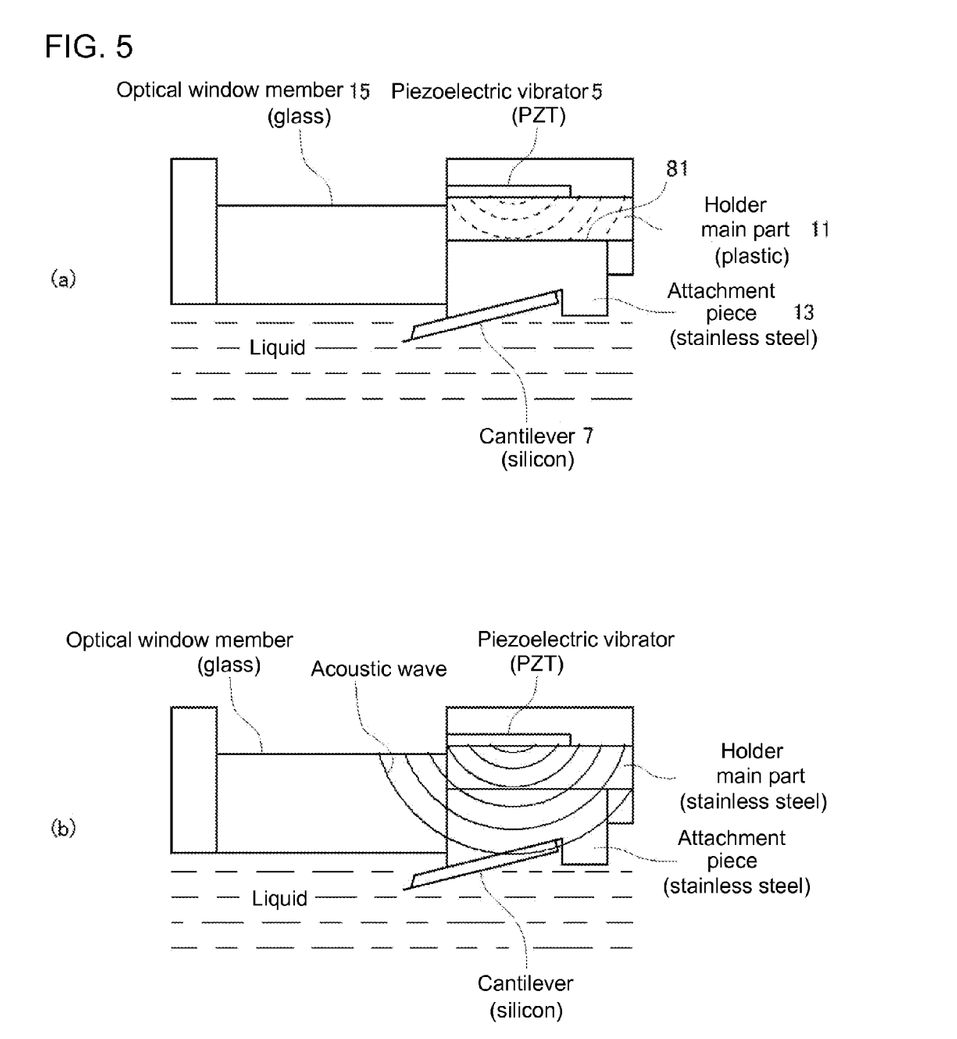
FIG. 5(a) is a view illustrating inhibition of generation and propagation of an acoustic wave in the cantilever excitation device of the present invention.
FIG. 5(b) is a reference view for comparison illustrating a state of the generation and the propagation of the acoustic wave when the holder main part is made of stainless steel.

FIG. 5(a) is a view for illustrating the inhibition of the acoustic wave by this embodiment. On the other hand, FIG. 5(b) is a reference view for comparison, which illustrates the generation and the propagation of the acoustic wave when the material of the holder main part is the stainless steel (SUS316) as that of the attachment piece.

As illustrated in FIG. 5(a), in this embodiment, the material of the piezoelectric vibrator 5 is PZT ($Z_a$=33×10$^6$ kg/m) and the material of the holder main part 11 is the engineering plastic (PEEK™, $Z_a$=3.2×10$^6$ kg/m$^2$s). Therefore, the acoustic impedance of the holder main part 11 is one order of magnitude or more lower than the acoustic impedance of the piezoelectric vibrator 5. By holding the piezoelectric vibrator 5 by the member having the different acoustic impedance in this manner, the generation of the acoustic wave is inhibited and strength of the generated acoustic wave becomes significantly smaller.

Further, this embodiment not only decreases the strength of the generated acoustic wave but also inhibits the propagation of the acoustic wave. This is realized by a following material boundary.

In FIG. 5(a), a piece side boundary 81 is the boundary between the holder main part 11 and the attachment piece 13 and a window side boundary 83 is the boundary between the holder main part 11 and the optical window member 15. As described above, in this embodiment, the material of the attachment piece 13 is the stainless steel (SUS316, $Z_a$=36×10$^6$ kg/m$^2$s) and the material of the optical window member 15 is the glass (BK7, $Z_a$=11×10$^6$ kg/m$^2$s). Therefore, the acoustic impedance of the holder main part 11 is significantly lower than the acoustic impedances of the attachment piece 13 and the optical window member 15.

Acoustic impedance matching affects transmissivity of the acoustic wave at the material boundary. The boundary formed of two materials of which values of the acoustic impedance are $Z_{a1}$ and $Z_{a2}$, respectively, is considered. When the acoustic wave is perpendicularly incident on such material boundary, the transmissivity of the energy of the acoustic wave is represented by a following equation. This equation represents that the larger acoustic impedance mismatch is, the lower the transmissivity is.

$$Te=(4 \cdot Z_{a1} \cdot Z_{a2})/(Z_{a1}+Z_{a2})^2$$

In this embodiment, transmissivity Te is approximately 0.31 at the piece side boundary 81 (between the holder main part 11 and the attachment piece 13), and the transmissivity Te is approximately 0.71 at the window side boundary 83 (between the holder main part 11 and the optical window member 15).

In this manner, the transmissivity is low at the piece side boundary 81 and the window side boundary 83 and the acoustic wave is reflected to be attenuated at the boundaries. The piece side boundary 81 and the window side boundary 83 are located between the piezoelectric vibrator 5 and the cantilever 7, and they act as the material boundaries around the piezoelectric vibrator 5 to block a transmission path of the acoustic wave from the piezoelectric vibrator 5 to the cantilever 7.

FIGS. 5(a) and 5(b) are compared to each other. In FIG. 5(b), the material of the holder main part 11 is the same stainless steel as that of the attachment piece 13. In this case, the acoustic impedance of the holder main part 11 is the same as that of the attachment piece 13, and further this is substantially the same as that of the piezoelectric vibrator 5 and also is close to that of the optical window member 15. Therefore, the generation of the acoustic wave is not inhibited. Also, the acoustic wave is not reflected at the boundary present around the piezoelectric vibrator and the transmissivity increases. On the other hand, in this embodiment, the generation and the propagation of the acoustic wave are inhibited and the effect of the acoustic wave to cantilever vibration characteristics may be significantly decreased.

As is clear from FIG. 5(a), in this embodiment, the material boundary does not cover an entire periphery of the piezoelectric vibrator 5. In this manner, within the scope of the present invention, the material boundary may be provided within a range in which the effect of the acoustic wave may be sufficiently decreased and the effect of the present invention may be sufficiently obtained. However, within the scope of the present invention, it is also possible that the material boundary is provided on the entire periphery of the piezoelectric vibrator 5. For example, the entire periphery of the piezoelectric vibrator may be covered with the material such as the plastic and further the entire periphery thereof may be covered with the material such as the stainless steel.

<Cantilever Excitation Utilizing Elastic Deformation>

As already described, in this embodiment, the cantilever vibration is excited by utilizing the elastic deformation of the elastic hinge instead of inhibiting the generation and the propagation of the acoustic wave.

As illustrated in FIG. 1(c), in this embodiment, the holder main part 11 is provided with the elastic hinge 25 having a hinge structure. The piezoelectric vibrator 5 is fixed on one side (upper surface) of the elastic hinge 25 and the attachment piece 13 is fixed on the other side (lower surface) thereof. By this configuration, the piezoelectric vibrator 5 may efficiently induce deformation of the elastic hinge 25 and directly vibrate the attachment piece 13 fixed on the other side.

Figure 6:
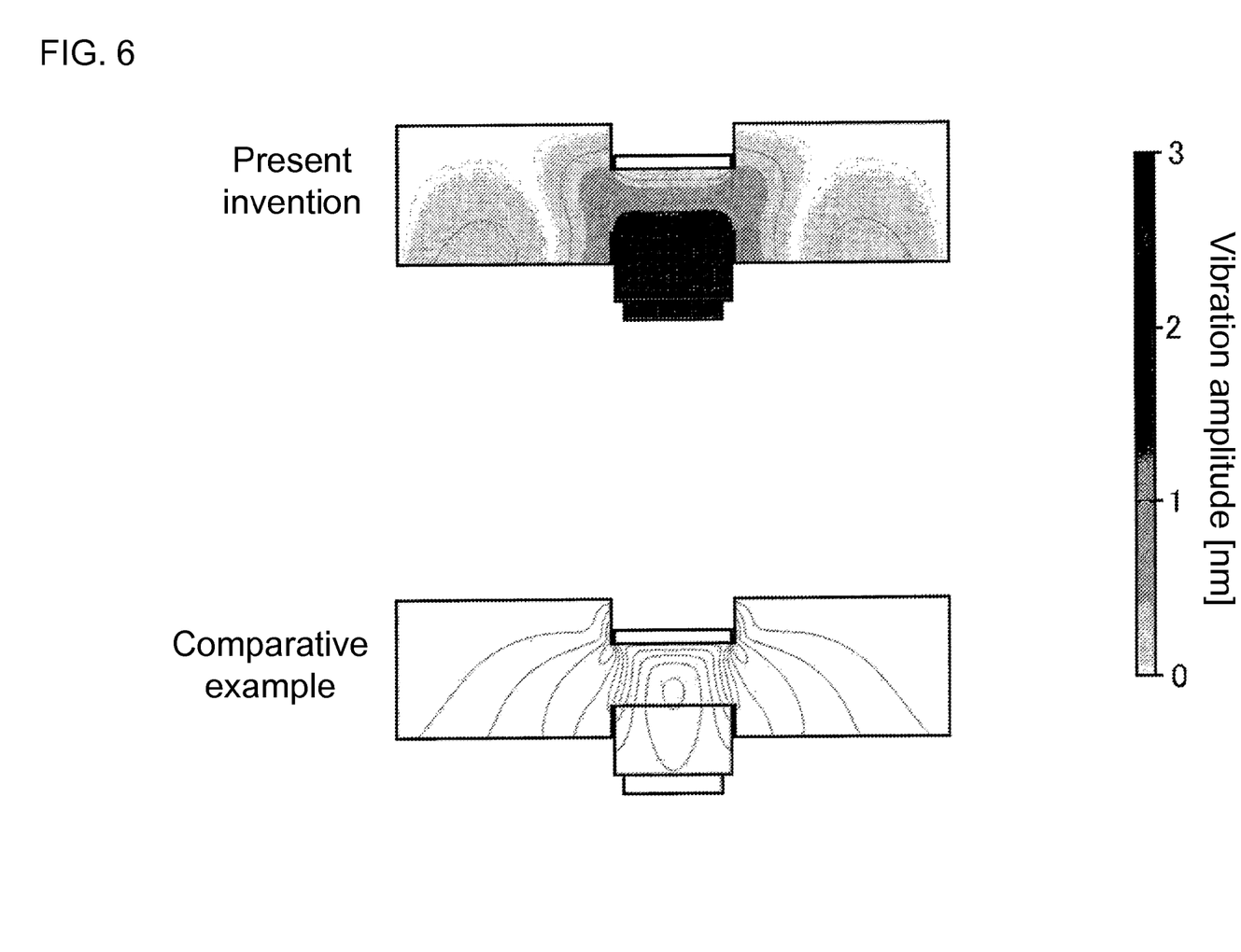
FIG. 6 is a view illustrating a calculation result of vibration amplitude distribution on a cross-section of the cantilever holder in the cantilever excitation device.

FIG. 6 illustrates a result of calculation by a finite element method (FEM) using a two-dimensional model performed by the inventor of the present invention for examining vibration amplitude by the elastic deformation. An upper side is the result of calculation of the cantilever excitation device of the present invention in which the material of the holder main part 11 is the engineering plastic (PEEK™ and the material of the attachment piece 13 is the stainless steel (SUS316). A lower side is the result of calculation for comparison in which the material of both of the holder main part 11 and the attachment piece 13 is the stainless steel (SUS316). As a condition of the calculation, the excitation signal applied to the piezoelectric vibrator 5 was set such that AC potential $V_{p-p}$=1 (V) and an excitation frequency f=148 kHz.

As indicated in the upper calculation result, in this embodiment, the elastic modulus of the holder main part 11 is low (Young's modulus $E_Y$=3.5 GPa), so that displacement amplitude was large. It was proved that the amplitudes of the part on the other side (attachment piece side) of the elastic hinge 25 and the attachment piece 13 attached thereto became large, and the attachment piece 13 and the cantilever 7 may be efficiently excited.

On the other hand, as indicated in the lower calculation result, when the material of the holder main part 11 was replaced with the stainless steel, since the elastic modulus of the stainless steel is high ($E_Y$=197 GPa), the elastic deformation was significantly small and the amplitude was approximately 0.

<Regarding Waterproof Function>

This embodiment is advantageous also in terms of waterproof property of the piezoelectric vibrator 5 as described hereinafter. In this embodiment, the piezoelectric vibrator 5 is arranged on one side and the cantilever 7 is arranged on the other side across the cantilever holder 3, and the cantilever 7 is soaked in the liquid. Further, the optical window member 15 also is preferably provided. By such a configuration, it is possible to avoid the contact of the piezoelectric vibrator 5 with the solution and to maintain the electrical insulation of the piezoelectric vibrator 5 from the solution.

In order to avoid the contact of the piezoelectric vibrator 5 with the solution, it is also possible to cover the piezoelectric vibrator 5 with a waterproof polymer. However, the waterproof polymer absorbs the solution to swell and changes a relative position of the probe to the specimen, so that this causes deterioration in measurement accuracy. It is possible to avoid the contact of the piezoelectric vibrator 5 with the solution without using such waterproof polymer, so that this embodiment is advantageous and may improve the measurement accuracy.

The above-described waterproof function also relates to inhibition of the effect of the acoustic wave and improvement in the frequency response characteristics, which are principal advantages of the present invention. This point is described with reference to the conventional acoustic excitation method.

As already described as the background art of the present invention, in the acoustic excitation method, the acoustic wave excites the structural resonance of the holder member between the piezoelectric vibrator and the cantilever and complicates the frequency response characteristics of the cantilever. When the piezoelectric vibrator and the cantilever are away from each other, the paths of the acoustic wave are large in number and complicated, and as a result, the frequency response characteristics of the cantilever becomes complicated. Therefore, it is considered to bring the piezoelectric vibrator close to the cantilever in order to improve the frequency response characteristics. When the piezoelectric vibrator is arranged near the cantilever, it is necessary to make the piezoelectric vibrator waterproof. However, when the waterproof polymer as general waterproof means is used, the waterproof polymer swells to cause the deterioration in the measurement accuracy.

On the other hand, in this embodiment, although the piezoelectric vibrator 5 and the cantilever 7 are located away from each other through the cantilever holder 3 (holder main part 11 and attachment piece 13), the effect of the acoustic wave is small. By such configuration, it is possible to avoid direct contact of the piezoelectric vibrator 5 with the liquid. In this manner, the present invention may obtain not only excellent resonance characteristics while preventing a negative effect of the acoustic wave by the simple structure but also the advantage to easily realize the waterproof function of the piezoelectric vibrator 5.

As described above, the attachment region 21 of the holder main part 11 is formed to be thinner than the window region 23, and the cantilever 7 is attached to the piezoelectric vibrator 5 through the attachment region 21 of the holder main part 11 and the attachment piece 13. By the configuration, although a part of the attachment piece 13 to which the cantilever 7 is attached is simultaneously soaked in the solution when the cantilever 7 is soaked in the solution, it is not necessary to soak the attachment region 21 of the holder main part 11 in the solution, therefore, it is possible to surely prevent the contact of the piezoelectric vibrator 5 attached to the attachment region 21 on the side opposite to the attachment piece 13 with the solution.

Meanwhile, although the configuration is such that the attachment region 21 of the holder main part 11 is not brought into contact with a liquid surface in this embodiment, this is not an indispensable configuration for preventing the contact of the piezoelectric vibrator 5 with the solution. What is important is that direct contact of the piezoelectric vibrator 5 with the liquid is avoided by the attachment piece 13 and the holder main part 11 interposed between the piezoelectric vibrator 15 and the cantilever 7 soaked in the solution.

<Frequency Response Characteristics>

Figure 7:
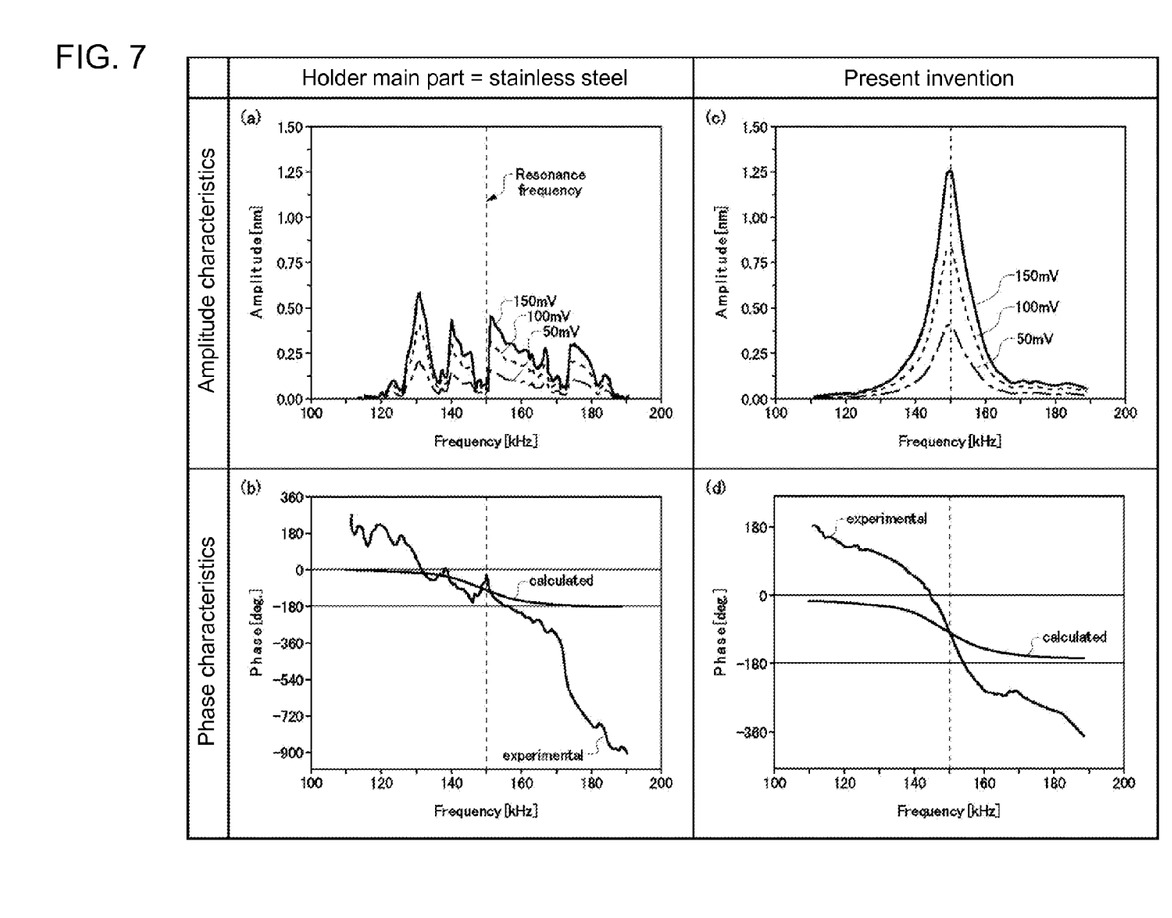
FIG. 7 is a view illustrating frequency response characteristics of the cantilever.

FIG. 7 illustrates amplitude/phase vs frequency curves of the cantilever 7 measured with the cantilever excitation device 1 of this embodiment. The used cantilever 7 was made of silicon, the resonance frequency was 148 kHz, and a Q-factor was 7.6.

In FIG. 7, two graphs (a) and (b) on a left side are data for comparison and measurement results when the stainless steel (SUS316) is used as the material of the holder main part 11. An upper graph (a) is an amplitude-frequency curve, that is to say, the frequency and the amplitude are represented along an abscissa axis and a longitudinal axis, respectively. Also, a lower graph (b) is a phase-frequency curve, that is to say, the frequency and the phase are represented along the abscissa axis and the longitudinal axis, respectively. In the measurement of the graphs (a) and (b), the configuration (component shape, component material and the like) other than the holder material was similar to that of the cantilever excitation device 1 of this embodiment.

The upper left graph (a) indicates the measurement results when an excitation signal voltage is 50 mV, 100 mV, and 150 mV. As illustrated, when the stainless steel is used, by the generation and the propagation of the acoustic wave, the structural resonance in the cantilever holder 3 is excited, and as a result, a great number of unnecessary amplitude peaks are generated near a cantilever resonance frequency (148 kHz).

In the lower left graph (b), the phase-frequency curve of the measurement result is indicated together with the curve calculated from the Q-factor of the cantilever 7. Since the measurement results are substantially the same when the excitation signal voltage is 50 mV, 100 mV, and 150 mV, one measurement result is indicated.

As illustrated in the graph (b), in the calculated phase-frequency curve, the phase changes along a constant slope near the resonance frequency. However, in the phase-frequency curve of an actual measured result, large disturbance occurs near the resonance frequency and also phase delay becomes large.

The cantilever excitation device 1 of this embodiment is preferably applied to the above-described frequency modulation atomic force microscope (FM-AFM), for example. The FM-AFM controls a distance between the probe and the specimen using a phase slope near the resonance frequency. Therefore, the disturbance of the phase-frequency curve causes significant deterioration in the quantitative characteristics and stability.

On the other hand, in FIG. 7, two graphs (c) and (d) on a right side are the measurement results of lever excitation characteristics in the cantilever excitation device 1 according to the present invention in which the material of the holder main part 11 is the engineering plastic (specifically, PEEK™. Herein also, an upper graph (c) is the amplitude-frequency curve and a lower graph (d) is the phase-frequency curve.

According to the present invention, a unique peak conforming to the resonance frequency of the cantilever 7 is observed. The phase-frequency curve also flatly changes. Also, the phase delay is significantly smaller than that in a case in which the stainless steel is used. Since the phase-frequency curve flatly changes near the resonance frequency, quantitative correction after the measurement may be performed.

Also, when the graphs (a) and (c) of the amplitude characteristics are compared to each other, the amplitude is larger in the present invention than that in the case in which the stainless steel is used. That is to say, in the present invention, a value of the amplitude relative to the amplitude voltage becomes larger. This indicates that the cantilever vibration is efficiently excited by the elastic deformation of the elastic hinge structure.

Actually, in the existing acoustic excitation method, the frequency response characteristics of the cantilever are quite complicated as illustrated in the graphs (a) and (b) on the left side of FIG. 7. In the acoustic excitation method, the cantilever is driven through the holder and this may be said to be indirect drive. Although the indirect drive is simple in structure, the structural resonance of the holder complicates the frequency response characteristics of the cantilever. On the other hand, the present invention may prevent the complication of the frequency response characteristics by an indirect drive method with the simple structure as indicated in the graphs (c) and (d) on the right side in FIG. 7, and may obtain an extremely excellent effect that the method may be mounted and utilized more easily than a direct drive method such as a magnetic excitation method and a photothermal excitation method.

The preferred embodiment of the present invention is described above. In the above-described embodiment, the holder main part 11 and the attachment piece 13 correspond to the first and second parts of the present invention, respectively. In the present invention, the first part has the acoustic impedance different from that of the piezoelectric vibrator and transmits the vibration of the piezoelectric vibrator by the elastic deformation. The second part has the acoustic impedance different from that of the first part and forms the material boundary for blocking the propagation of the acoustic wave between the same and the first part. The first and second parts are interposed between the piezoelectric vibrator and the cantilever.

By such configuration, the acoustic impedance of the piezoelectric vibrator is different from that of the first part, so that the generation of the acoustic wave is inhibited. Also, the material boundary at which the acoustic impedance changes is formed between the first and second parts, so that the propagation path of the acoustic wave is blocked. On the other hand, the first part elastically deforms to transmit the vibration of the piezoelectric vibrator.

In the above-described invention, the cantilever excitation device has the simple configuration using the piezoelectric vibrator as the conventional acoustic excitation method. However, quite different from the conventional acoustic excitation method, which positively transmits the acoustic wave, the present invention inhibits the generation and the propagation of the acoustic wave. According to this, the present invention limits the excitation and the propagation of the structural resonance due to the acoustic wave, inhibits the effect of the structural resonance, and prevents the complication of the cantilever frequency response characteristics. The present invention transmits the vibration of the piezoelectric vibrator by utilizing the elastic deformation in place of the acoustic wave to excite the cantilever. In this manner, it is possible to provide the cantilever excitation device capable of inhibiting the complication of the frequency response characteristics by the simple structure.

Also, as described with reference to FIG. 3, in the present invention, it is possible that the acoustic impedance of the first part (holder main part 11) is not higher than half the acoustic impedance of the piezoelectric vibrator and the acoustic impedance of the second part (attachment piece 13) is not lower than twice the acoustic impedance of the first part. By setting the acoustic impedance in this manner, it is possible to effectively inhibit the generation of the acoustic wave. Also, it is possible to form the material boundary so as to effectively block the propagation path of the acoustic wave.

Also, it is possible that the elastic modulus of the first part is not higher than one-tenth of the elastic modulus of the second part. By setting the elastic modulus in this manner, it is possible to effectively transmit the vibration of the piezoelectric vibrator to the cantilever.

Also, in the above-described embodiment, the first part is the holder main part 11, the second part is the attachment piece 13 (attachment member) for attaching the cantilever 7 to the holder main part 11, the elastic hinge 25 is provided on the holder main part 11, and the piezoelectric vibrator 5 and the attachment piece 13 are attached on one side and the other side of the elastic hinge 25, respectively. By such configuration, it is possible to effectively transmit the vibration of the piezoelectric vibrator 5 to the cantilever 7 by utilizing the elastic hinge 25.

Figure 1:
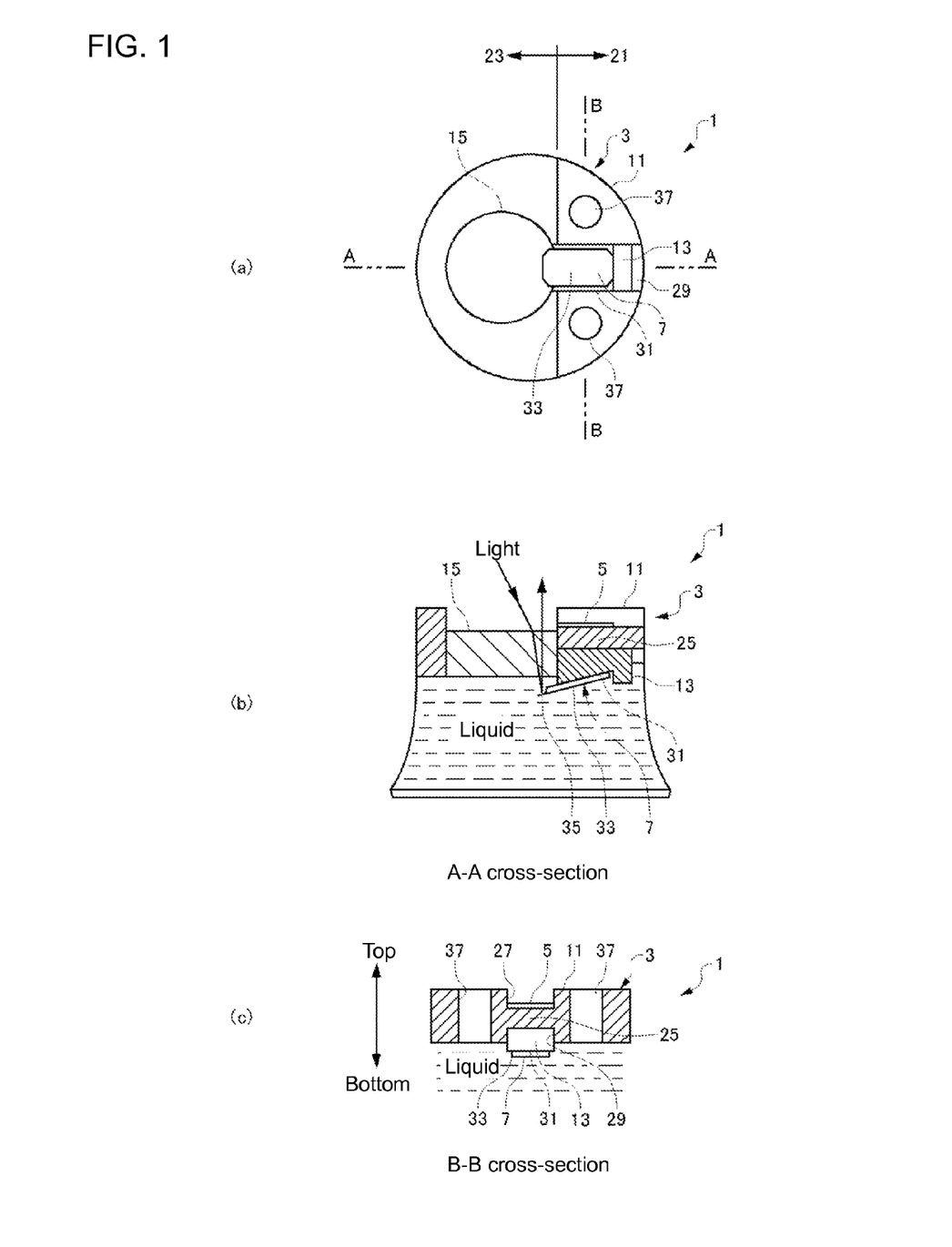
FIG. 1(a) is a bottom view of a cantilever excitation device according to an embodiment.
FIG. 1(b) is a cross-sectional view of the cantilever excitation device according to the embodiment.
FIG. 1(c) is a cross-sectional view of the cantilever excitation device according to the embodiment.

Within the scope of the present invention, the elastic hinge is not limited to the configuration in FIG. 1. The elastic hinge has the structure to increase the elastic deformation of a hinge region (at least a part of the region of the member) than that of a periphery of the hinge region. Typically, the elastic hinge is formed of a local thin part. Various types of elastic hinges may be applied to the present invention.

As a modified example of the hinge structure, it is possible that two thin parts are provided on both sides of attachment position of the piezoelectric vibrator 5 and the attachment piece 13. In this case, the two thin parts and a part interposed therebetween act as the elastic hinge.

Also, in another modified example, the member of the hinge region may be different from the member of the peripheral portion. For example, a plate-shaped member is attached to an opening of the holder main part and the like. The elastic modulus of the plate-shaped member may be lower than that of the peripheral holder main part. The piezoelectric vibrator and the attachment member may be fixed on both sides of the plate-shaped member.

Also, in the above-described embodiment, the cantilever holder is composed of the holder main part and the attachment piece, that is to say, this is composed of one first part and one second part. However, within the scope of the present invention, the cantilever holder may be provided with a plurality of first parts. Also, the cantilever holder may be provided with a plurality of second parts. For example, a plurality of first parts and a plurality of second parts may be alternatively laminated.

Also, as described in the above-described embodiment, the cantilever holder 3 may have the optical window member 15 for transmitting measurement light of the displacement of the cantilever 7, and the optical window member 15 may have the acoustic impedance different from that of the holder main part 11 and may form the material boundary for blocking the propagation of the acoustic wave between the same and the holder main part 11.

By such configuration, the optical window member 15 also contributes to block of the propagation path of the acoustic wave and contributes to decrease in the effect of the structural resonance. Therefore, it is possible to effectively prevent the complication of the frequency response characteristics of the cantilever also with the configuration provided with the optical window member.

Also, in the above-described embodiment, a part of the piezoelectric vibrator 5 is exposed and is not brought into contact with the holder main part 11. Also, the material boundary is not formed on the entire periphery of the piezoelectric vibrator 5. However, within the scope of the present invention, the entire periphery of the piezoelectric vibrator 5 may be enclosed by at least one member having the acoustic impedance different from that of the piezoelectric vibrator 5. Further, the periphery thereof may be enclosed by the member having the different acoustic impedance. By such configuration, it is possible to further surely inhibit the effect of the acoustic wave and effectively prevent the complication of the frequency response characteristics of the cantilever.

Also, one aspect of the present invention is the scanning probe microscope provided with the above-described cantilever excitation device 1. By this configuration, it is possible to prevent the complication of the frequency response characteristics of the cantilever and perform measurement using the excellent characteristics.

The present invention is especially suitable for the dynamic mode AFM in liquid and the frequency response characteristics are not complicated, so that it is possible to significantly improve the quantitative characteristics and the stability of the force curve measurement and improve the stability and the reliability of the measurement.

Also, the present invention may be applied to other than the dynamic mode AFM in liquid within the possible scope. For example, the present invention may be applied to a scanning near-field optical microscope (SNOM). The SNOM makes use of a principle of the AFM and may be considered to be a kind of the AFM.

Another aspect of the present invention is a cantilever excitation method for exciting the vibration of the cantilever by transmitting the vibration of the piezoelectric vibrator to the cantilever as described above. Also, another aspect of the present invention is the method of manufacturing the cantilever excitation device as described above.

The advantage of the present invention may be similarly obtained by other aspects. Also, a variety of additional configurations of the present invention may be applied to various aspects other than the above-described cantilever excitation device.

The preferred embodiment of the present invention is described above. However, it goes without saying that the present invention is not limited to the above-described embodiment and one skilled in the art may modify the above-described embodiment within the scope of the present invention.

Although the preferred embodiment of the present invention currently conceivable is described above, it is understood that various modifications may be made to this embodiment and it is intended that attached claims include the true spirit of the present invention and all the modifications within the scope of the invention.

INDUSTRIAL APPLICABILITY

As described above, the cantilever excitation device according to the present invention has the effect that the frequency response characteristics of the cantilever may be improved and is preferably used in the dynamic mode AFM in liquid and the like.

DESCRIPTION OF REFERENCE NUMERALS 1 cantilever excitation device
3 cantilever holder
5 piezoelectric vibrator
7 cantilever
11 holder main part
13 attachment piece
15 optical window member
21 attachment region
23 window region
25 elastic hinge
31 lever attachment surface
33 lever base part
35 lever part
37 attachment hole
81 piece side boundary
83 window side boundary

The invention claimed is:

1. A cantilever excitation device for exciting vibration of a cantilever, comprising:
the cantilever;
a cantilever holder for holding the cantilever; and
a piezoelectric vibrator attached to the cantilever holder,
wherein the cantilever holder includes a first part having an acoustic impedance different from the acoustic impedance of the piezoelectric vibrator for transmitting the vibration of the piezoelectric vibrator by elastic deformation and a second part having the acoustic impedance different from the acoustic impedance of the first part for forming a material boundary to block propagation of an acoustic wave between the first part and the second part, and the first part and the second part are interposed between the piezoelectric vibrator and the cantilever.

2. The cantilever excitation device according to claim 1, wherein the acoustic impedance of the first part is not higher than half the acoustic impedance of the piezoelectric vibrator and the acoustic impedance of the second part is not lower than twice the acoustic impedance of the first part.

3. The cantilever excitation device according to claim 1, wherein an elastic modulus of the first part is not higher than one-tenth of the elastic modulus of the second part.

4. The cantilever excitation device according to claim 1, wherein the first part is interposed between the piezoelectric vibrator and the second part and the second part is interposed between the first part and the cantilever.

5. The cantilever excitation device according to claim 4, wherein the first part is a holder main part including an elastic hinge, the second part is an attachment member for attaching the cantilever to the holder main part, and the piezoelectric vibrator and the attachment member are attached on one side and the other side of the elastic hinge, respectively.

6. The cantilever excitation device according to claim 5, wherein the cantilever holder includes an optical window member for transmitting measurement light of displacement of the cantilever, the optical window member has the acoustic impedance different from the acoustic impedance of the holder main part for forming the material boundary to block the propagation of the acoustic wave between the holder main part and the optical window member.

7. The cantilever excitation device according to claim 1, wherein an entire periphery of the piezoelectric vibrator is enclosed by at least one member having the acoustic impedance different from the acoustic impedance of the piezoelectric vibrator.

8. A scanning probe microscope, comprising the cantilever excitation device according to claim 1.

9. The scanning probe microscope according to claim 8, wherein the cantilever excitation device is used in a state in which the cantilever and a portion of the cantilever holder for holding the cantilever are soaked in liquid and a portion of the cantilever holder to which the piezoelectric vibrator is attached is separated from the liquid.

10. A cantilever excitation method for transmitting vibration of a piezoelectric vibrator to a cantilever to excite the vibration of the cantilever, comprising:
   providing a cantilever holder including a first part having an acoustic impedance different from the acoustic impedance of the piezoelectric vibrator for transmitting the vibration of the piezoelectric vibrator by elastic deformation and a second part having the acoustic impedance different from the acoustic impedance of the first part for forming a material boundary to block propagation of an acoustic wave between the first part and the second part;
   arranging the piezoelectric vibrator and the cantilever such that the first part and the second part are interposed between the piezoelectric vibrator and the cantilever;
   applying an excitation voltage signal to the piezoelectric vibrator; and
   exciting the cantilever by transmitting the vibration of the piezoelectric vibrator to the cantilever by the elastic deformation of the first part while limiting the propagation of the acoustic wave of the piezoelectric vibrator by the material boundary.

11. A method of manufacturing a cantilever excitation device for transmitting vibration of a piezoelectric vibrator to a cantilever to excite the vibration of the cantilever, the method comprising:
   preparing a first part and a second part as components of a cantilever holder, the first part being a component having an acoustic impedance different from the acoustic impedance of the piezoelectric vibrator for transmitting the vibration of the piezoelectric vibrator by elastic deformation and the second part being a component having the acoustic impedance different from the acoustic impedance of the first part for forming a material boundary to block propagation of an acoustic wave between the first part and the second part; and
   arranging the piezoelectric vibrator, the cantilever, the first part, and the second part such that the first part and the second part are interposed between the piezoelectric element and the cantilever.

* * * * *